United States Patent
Riegerbauer

(10) Patent No.: US 8,641,364 B2
(45) Date of Patent: Feb. 4, 2014

(54) BLADE FOR AN IMPELLER WHEEL

(75) Inventor: Hermann Riegerbauer, Leibnitz (AT)

(73) Assignee: Bew Betriebs und Entwicklung von Wasserkraftanlagen GmbH, Wien (AT)

( * ) Notice: Subject to any disclaimer, the term of this patent is extended or adjusted under 35 U.S.C. 154(b) by 1224 days.

(21) Appl. No.: 12/279,202

(22) PCT Filed: Jan. 23, 2007

(86) PCT No.: PCT/AT2007/000026
§ 371 (c)(1),
(2), (4) Date: Sep. 11, 2008

(87) PCT Pub. No.: WO2007/092970
PCT Pub. Date: Aug. 23, 2007

(65) Prior Publication Data
US 2009/0035147 A1   Feb. 5, 2009

(30) Foreign Application Priority Data
Feb. 14, 2006   (AT) .................................. A 228/2006

(51) Int. Cl.
*F01D 1/06* (2006.01)
*F01D 5/04* (2006.01)
*F03D 11/00* (2006.01)
*F04D 1/08* (2006.01)

(52) U.S. Cl.
USPC ............. 415/83; 416/182; 416/183; 416/187; 416/197 A

(58) Field of Classification Search
USPC ................. 415/83; 416/182, 183, 187, 197 A
See application file for complete search history.

(56) References Cited

U.S. PATENT DOCUMENTS

| | | | | |
|---|---|---|---|---|
| 1,622,930 A | | 3/1927 | Karman | 416/183 |
| 2,753,808 A | * | 7/1956 | Kluge | 416/183 |
| 5,993,158 A | * | 11/1999 | Young | 416/132 R |

FOREIGN PATENT DOCUMENTS

| | | |
|---|---|---|
| DE | 3118648 | 2/1983 |
| DE | 29904668 | 6/1999 |
| GB | 524703 | 8/1940 |
| JP | 53072206 | 6/1978 |

* cited by examiner

*Primary Examiner* — David Nhu
(74) *Attorney, Agent, or Firm* — Andrew Wilford

(57) ABSTRACT

A paddle wheel rotatable about an axis and exposed to radial inward and crosswise water flow has a hub on the axis and about which the wheel is rotated in a rotation direction about the axis and a plurality of angularly spaced blades spaced radially outward from the hub, forming spaces through which water can flow, and each formed by a plurality of radially spaced arcuate elements each in turn having a radially outer end and a radially inner end. These elements are each concave between the respective ends toward the incoming water flow with the radial outer ends more widely spaced than radial inner ends such that each element forms an acute angle with the adjacent element or elements and the spaces between the blades narrow in a direction of flow of water through them.

1 Claim, 3 Drawing Sheets

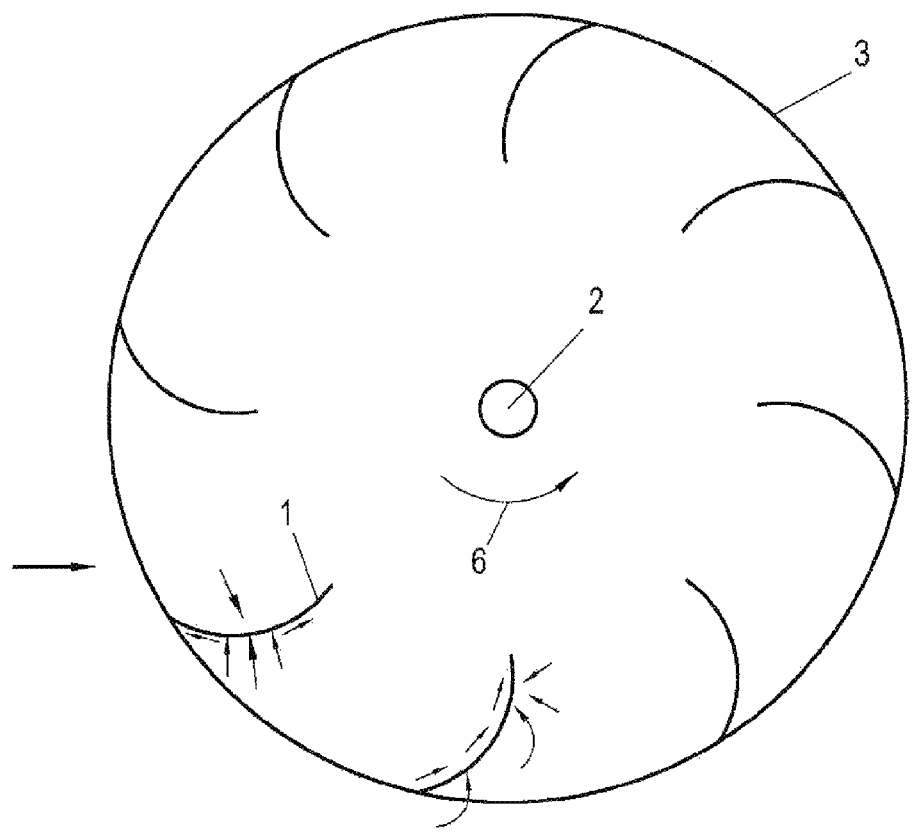
Fig. 1 - Prior Art
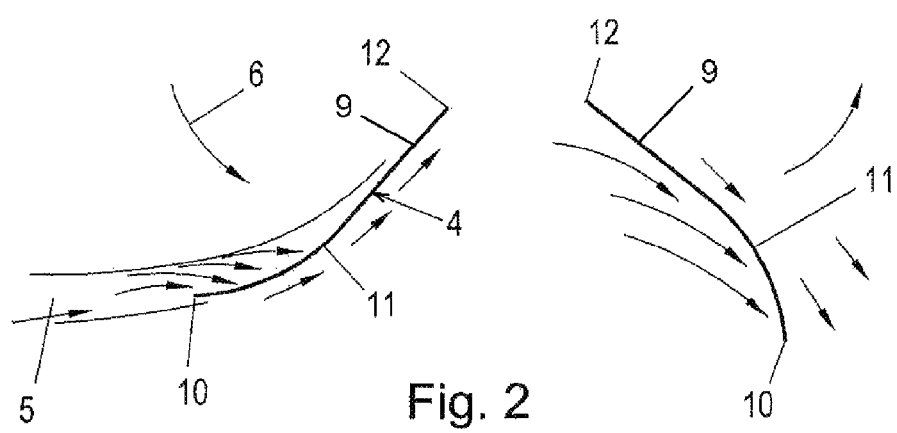
Fig. 2

BLADE FOR AN IMPELLER WHEEL

CROSS REFERENCE TO RELATED APPLICATIONS

This application is the US-national stage of PCT application PCT/AT2007/000026 filed 23 Jan. 2007, published 23 Aug. 2007 as WO2007/092970, and claiming the priority of Austrian patent application A228/2006 itself filed 14 Feb. 2006, whose entire disclosures are herewith incorporated by reference.

FIELD OF THE INVENTION

The invention relates to a blade for a paddle wheel.

BACKGROUND OF THE INVENTION

One-piece, continuous blades for paddle wheels are known from the prior art. The closed configuration of these known blades causes troublesome turbulence on their back sides.

OBJECT OF THE INVENTION

An object of the invention is therefore to create a blade for a paddle wheel that achieves an improvement of turbulence on the back sides of the blades.

SUMMARY OF THE INVENTION

This object is attained according to the invention by means of a blade of the type described above, in that the blade comprises at least two elements.

In a preferred embodiment of the invention the elements are separated by intermediate spaces, and/or are arranged like slats.

Another advantage of the invention is that the elements are offset from one another.

In a preferred embodiment the elements have a bend in the incoming flow direction, and are elongated in the discharge flow direction. This bend may be concave or convex.

Another advantage of the invention is that the elements extend at an angle relative to each other.

It may also be advantageous that the angle of the elements become larger outward from a wheel axis.

In a preferred embodiment the spacings between the elements may be equally large.

BRIEF DESCRIPTION OF THE DRAWING

The invention and all further advantages are explained in further detail below, based on nonlimitative embodiments illustrated in the drawings. Therein:

FIG. 1 is a schematic illustration of a cross-section of a paddle wheel having prior-art blades;

FIG. 2 is a schematic cross-section of an element according to the invention;

DETAILED DESCRIPTION

Figure 3:
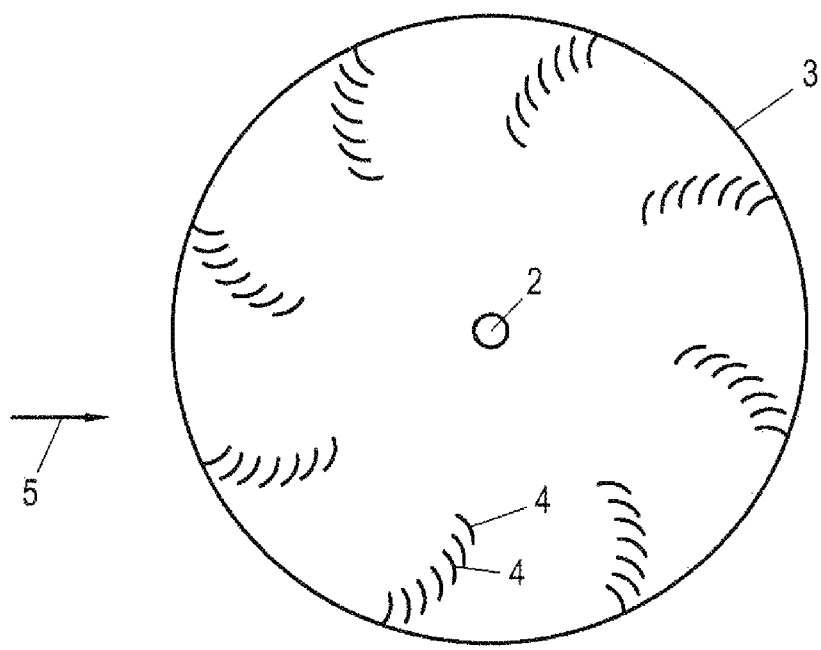
FIG. 3 is a schematic cross-section of a paddle wheel having blades made of the elements according to the invention.

FIG. 1 represents the schematic illustration of a section across a known paddle blade 3. According to FIG. 1 a paddle wheel 3 comprises at least one blade 1 and one hub 2.

The schematic illustration in FIG. 2 shows the lateral section of an element 4 according to the invention having an inner end 10 and an outer end 12, both in incoming flow direction, and in discharge flow direction. The incoming flow 5 of the water, and the rotational direction 6 of the paddle wheel are both illustrated. The element 4 may have a bend 11 on its side turned toward the incoming flow of water and may be elongated inward toward the hub 2, or toward the inner end 12 of the element 4 or can have a straight inner portion 9. It has been shown to be of particular advantage, if the bend is concave or convex.

A particular embodiment of the invention is shown in FIG. 3. Multiple blades 1 configured of multiple elements 4 are attached in a paddle wheel 3. By rotating the entire blade 1 about the hub 2 of the paddle wheel 3 the position of the elements 4 relative to the flow is continuously changed. On immersion of the blade 1 (one element 4 after the other) the outer most element 4 has a position having a very low flow resistance. Upon further rotation of the blade 1 the next inner element 4 is also immersed in the flow. At a position perpendicular to the flow the elements 4 almost act like a one-piece blade 1. In other positions of the blade 1 according to the invention the water can flow through the intermediate spaces. These intermediate spaces create slat-like, or blind-like blades 1. Any troublesome turbulence on the back side of the blade 1 is reduced, and any forces counteracting movement of the paddle wheel 3 are reduced. The blade 1 made of multiple elements 4 or its centerline 7 may be either bent or straight.

Figure 4:
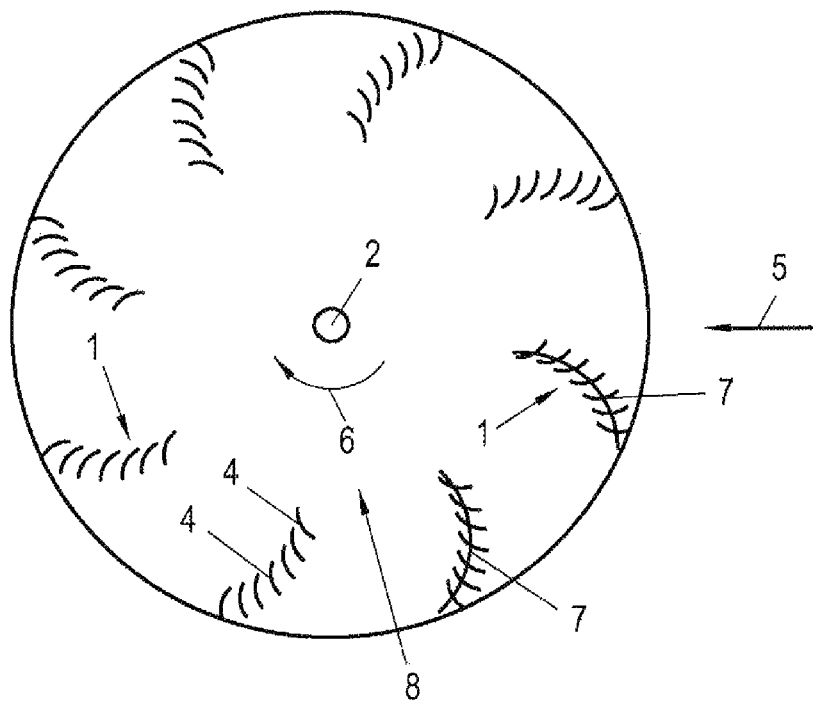
FIG. 4 is a schematic cross-section of a paddle wheel having blades made of the elements according to the invention, and a centerline.

As shown in FIG. 4, the paddle wheel 3 in the embodiment according to the invention, having the blades 1 configured of elements 4, may be flowed through from both directions 5. Depending on the strength of the flow, it may be necessary to align the blades 1 in an open or closed manner in the flow direction.

Figure 5:
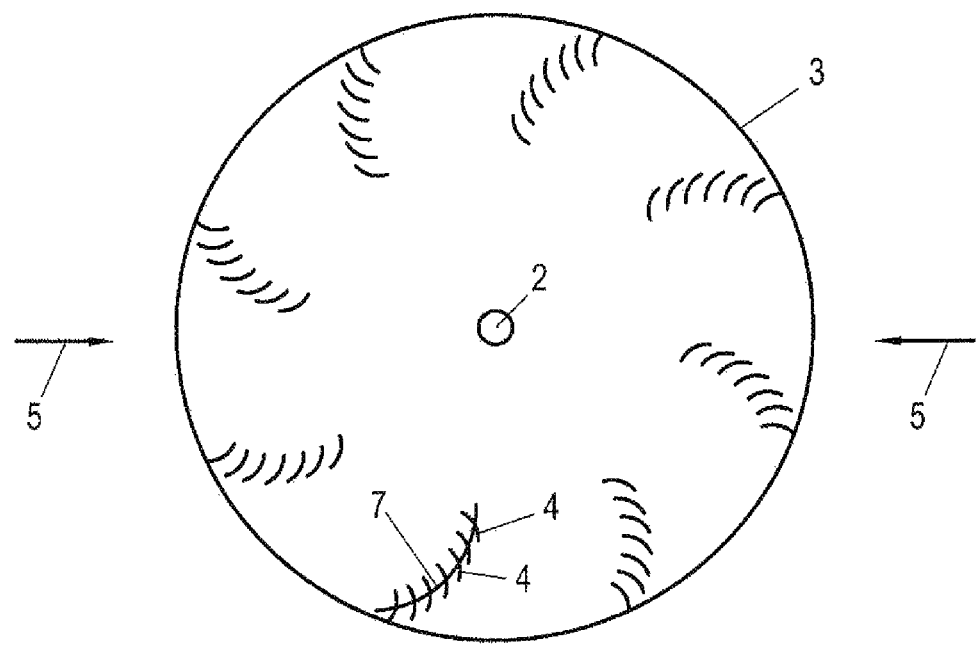
FIG. 5 is a schematic illustration of a cross-section of an alternate paddle wheel having blades made of the elements according to the invention.
Figure 5A:
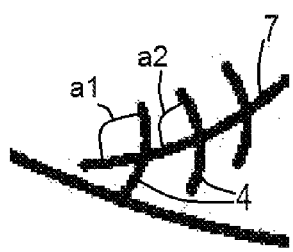
FIG. 5A is a large-scale view of a detail of FIG. 5.

FIG. 5 shows a particularly effective embodiment of the present invention. The longitudinal section of a one-piece blade 1 has a centerline 7. This centerline 7 follows the bend of the blade 1. As shown in detail in FIG. 5A at least two of the elements 4 according to the present invention are arranged on the centerline 7 such that the angle a1 between the centerline 7 and the first element 4 is smaller than the angle a2 between the centerline 7 and the second element 4 such that the elements extend relative to each other at an acute angle, that is not parallel. The intersections of the elements 4 and of the centerline 7 may have the same spacing from each other on the centerline 7. However, the spacing may also be different in a modified embodiment. In a particularly effective embodiment the elements 4 may have different sizes. The elements 4 may become smaller from the exterior toward the interior. Thus, the spacing between the elements 4 may also be different accordingly. It has been shown to be particularly effective that the spacing becomes smaller from the exterior toward the interior.

The invention claimed is:

1. A paddle wheel rotatable about an axis and exposed to radial inward and crosswise water flow, the paddle wheel having:
- a central hub on the axis and about which the wheel is rotated in a rotation direction about the axis; and
- a plurality of angularly spaced blades spaced radially outward from the central hub, forming spaces through which water can flow, and each formed by a plurality of radially spaced arcuate elements each in turn having a radially outer end and a radially inner end, the spaced arcuate elements of each blade being concave between the respective ends toward the incoming water flow, the radial outer ends of the spaced arcuate elements of each blade being more widely spaced than the radial inner ends such that each element forms an acute angle with the adjacent element or elements and the spaces between the blades narrow in a direction of flow of water through them, the acute angle each element forms with a centerline through the respective blade increasing toward the hub, each element of each blade being shorter than the adjacent element spaced radially outward therefrom and a spacing between each element and the adjacent element spaced radially outward therefrom decreasing toward the central hub.

* * * * *